(12) United States Patent
Yamaguchi et al.

(10) Patent No.: US 12,024,116 B2
(45) Date of Patent: Jul. 2, 2024

(54) BUCKLE DEVICE

(71) Applicant: KABUSHIKI KAISHA TOKAI-RIKA-DENKI-SEISAKUSHO, Aichi (JP)

(72) Inventors: Ryuji Yamaguchi, Aichi-ken (JP); Yoshio Mizuno, Aichi-ken (JP)

(73) Assignee: KABUSHIKI KAISHA TOKAI-RIKA-DENKI-SEISAKUSHO, Aichi (JP)

(*) Notice: Subject to any disclaimer, the term of this patent is extended or adjusted under 35 U.S.C. 154(b) by 0 days.

(21) Appl. No.: 17/833,612

(22) Filed: Jun. 6, 2022

(65) Prior Publication Data
US 2022/0396236 A1    Dec. 15, 2022

(30) Foreign Application Priority Data

Jun. 10, 2021   (JP) .................... 2021-097603

(51) Int. Cl.
*B60R 22/18*   (2006.01)
*A44B 11/25*   (2006.01)
*B60R 22/20*   (2006.01)

(52) U.S. Cl.
CPC .......... *B60R 22/20* (2013.01); *A44B 11/2503* (2013.01); *B60R 2022/1806* (2013.01)

(58) Field of Classification Search
CPC ............. A44B 11/2503; B60R 22/28; B60R 2022/1806; B60R 22/20
See application file for complete search history.

(56) References Cited

U.S. PATENT DOCUMENTS

| | | | | |
|---|---|---|---|---|
| 6,302,346 | B1* | 10/2001 | Brown | B60R 22/28 280/805 |
| 8,708,370 | B1* | 4/2014 | Barker | B60R 22/28 280/805 |
| 11,135,997 | B2 | 10/2021 | Shimazu et al. | |
| 2018/0319361 | A1* | 11/2018 | Faruque | B60R 22/22 |
| 2019/0001922 | A1* | 1/2019 | Wang | B60R 22/18 |
| 2020/0247352 | A1* | 8/2020 | Shimazu | B60R 22/26 |
| 2022/0396237 | A1* | 12/2022 | Yamaguchi | B60R 22/26 |
| 2023/0064662 | A1* | 3/2023 | Yamaguchi | B60R 22/195 |
| 2023/0067413 | A1* | 3/2023 | Yamaguchi | B60R 22/185 |

FOREIGN PATENT DOCUMENTS

JP      2020-125010 A    8/2020

* cited by examiner

*Primary Examiner* — Robert Sandy
*Assistant Examiner* — Michael S Lee
(74) *Attorney, Agent, or Firm* — Studebaker & Brackett PC (57) ABSTRACT

In this buckle device, a base end portion of a belt is folded back on itself to form a ring-shaped portion, and the belt is wound onto a spool in a state in which the ring-shaped portion of the belt has been inserted through an insertion hole in the spool. This enables a winding radius of the belt to be increased by the base end portion of the belt and enables a load at which the belt is permitted to be pulled out to be reduced, when the belt is pulled out from the spool.

9 Claims, 9 Drawing Sheets

BUCKLE DEVICE

CROSS-REFERENCE TO RELATED APPLICATION

This application is based on and claims priority under 35 USC 119 from Japanese Patent Application No. 2021-97603 filed on Jun. 10, 2021, the disclosure of which is incorporated by reference herein.

BACKGROUND

Technical Field

The present invention relates to a buckle device in which a buckle body and a take-up shaft are coupled together via a coupling member.

Related Art

In a buckle device disclosed in Japanese Patent Application Laid-Open (JP-A) No. 2020-125010, in a state in which a webbing has been wound onto a spool, a buckle body and the spool are coupled together via the webbing, pull-out of the webbing from the spool is limited, and pull-out of the webbing from the spool is permitted at a pull-out permitting load or greater so that extending of the buckle body is permitted.

Note that in this buckle device, a base end portion of the webbing is folded back on itself to provide a ring-shaped portion, and the webbing is wound onto the spool in a state in which the spool has been inserted into the ring-shaped portion of the webbing.

SUMMARY

In consideration of the above circumstances, an object of the present invention is to obtain a buckle device capable of reducing a load at which pull-out of a coupling member is permitted.

A buckle device of a first aspect of the present invention includes a buckle body configured to engage with a tongue provided at a webbing worn by an occupant; a coupling member that has a leading end side coupled to the buckle body and a base end portion folded back on itself to form a ring-shaped portion; and a take-up shaft that has an inner portion open through an insertion hole, the coupling member being wound onto the take-up shaft in a state in which the ring-shaped portion of the coupling member has been inserted through the insertion hole and anchored at the inner portion of the take-up shaft such that the take-up shaft is coupled to the buckle body via the coupling member, the take-up shaft being configured to limit pull-out of the coupling member and to permit pull-out of the coupling member at a pull-out permitting load or greater so as to permit extending of the buckle body.

In the buckle device of the first aspect of the present invention, the tongue provided at the webbing worn by an occupant is engaged with the buckle body. The leading end side of the coupling member is coupled to the buckle body, and a base end side of the coupling member is wound onto the take-up shaft such that the buckle body and the take-up shaft are coupled together via the coupling member and pull-out of the coupling member from the take-up shaft is limited.

Pull-out of the coupling member from the take-up shaft is permitted at the pull-out permitting load or greater so that extending of the buckle body is permitted.

Since the coupling member causes torque to act on the take-up shaft such that pull-out from the take-up shaft is permitted, when a combined radius of the coupling member and the take-up shaft at a pull-out position of the coupling member from the take-up shaft (hereafter referred to as the "the coupling member winding radius") is small, the pull-out permitting load of the coupling member is large.

Note that the base end portion of the coupling member is folded back on itself to form the ring-shaped portion, the inside of the take-up shaft is open through the insertion hole, and the coupling member is wound onto the take-up shaft in a state in which the ring-shaped portion of the coupling member has been inserted through the insertion hole and anchored inside the take-up shaft. This enables the coupling member winding radius to be increased by the base end portion of the coupling member and enables the pull-out permitting load of the coupling member to be reduced.

A buckle device of a second aspect of the present invention is the buckle device of the first aspect of the present invention, wherein the base end portion of the coupling member is folded back on itself at a radial direction inner side of the take-up shaft.

In the buckle device of the second aspect of the present invention, the base end portion of the coupling member is folded back on itself at the radial direction inner side of the take-up shaft. This enables the coupling member winding radius to be increased by the base end portion of the coupling member and enables the pull-out permitting load of the coupling member to be reduced, when the ring-shaped portion of the coupling member is pulled out from the take-up shaft.

A buckle device of a third aspect of the present invention is the buckle device of the first aspect or the second aspect of the present invention, wherein a base end of the coupling member is disposed at a circumferential direction position of the take-up shaft in a gap between the coupling member and a peripheral face of the insertion hole.

In the buckle device of the third aspect of the present invention, the base end of the coupling member is disposed at the circumferential direction position of the take-up shaft in the gap between the coupling member and the peripheral face of the insertion hole. This enables a reduction in the coupling member winding radius to be suppressed and enables an increase in the pull-out permitting load of the coupling member to be suppressed, when a location of the coupling member at a circumferential direction position of the take-up shaft in the vicinity of the ring-shaped portion of the coupling member is pulled out from the take-up shaft.

A buckle device of a fourth aspect of the present invention is the buckle device of any one of the first aspect to the third aspect of the present invention, further including an interjacent member interposed between the ring-shaped portion of the coupling member and a peripheral face of the insertion hole.

In the buckle device of the fourth aspect of the present invention, the interjacent member is interposed between the ring-shaped portion of the coupling member and the peripheral face of the insertion hole. The enables damage to the ring-shaped portion of the coupling member caused by the peripheral face of the insertion hole to be suppressed by the interjacent member.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
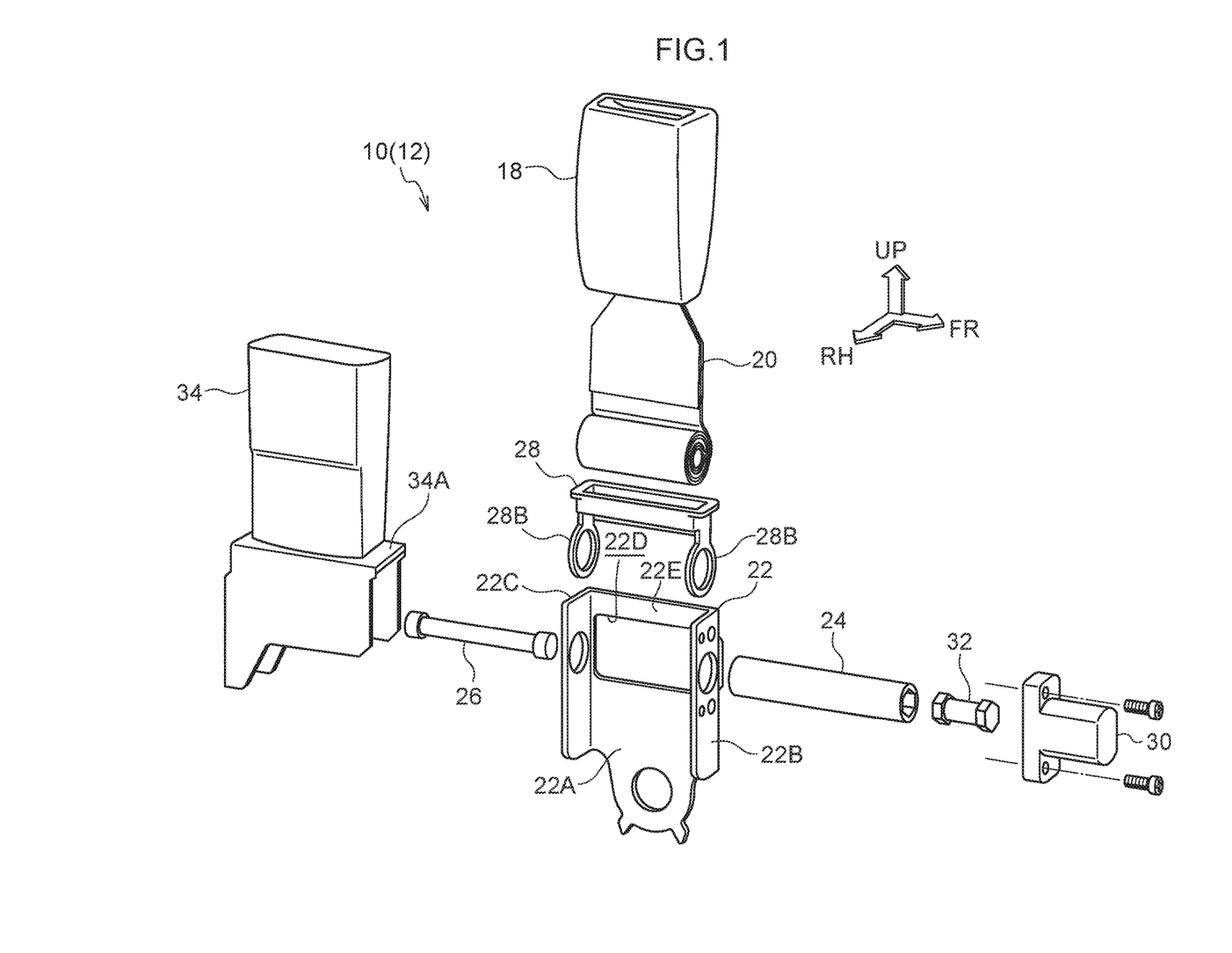
FIG. 1 is an exploded perspective view illustrating a buckle device according to a first exemplary embodiment of the present invention, as viewed obliquely from the front-right.
Figure 2:
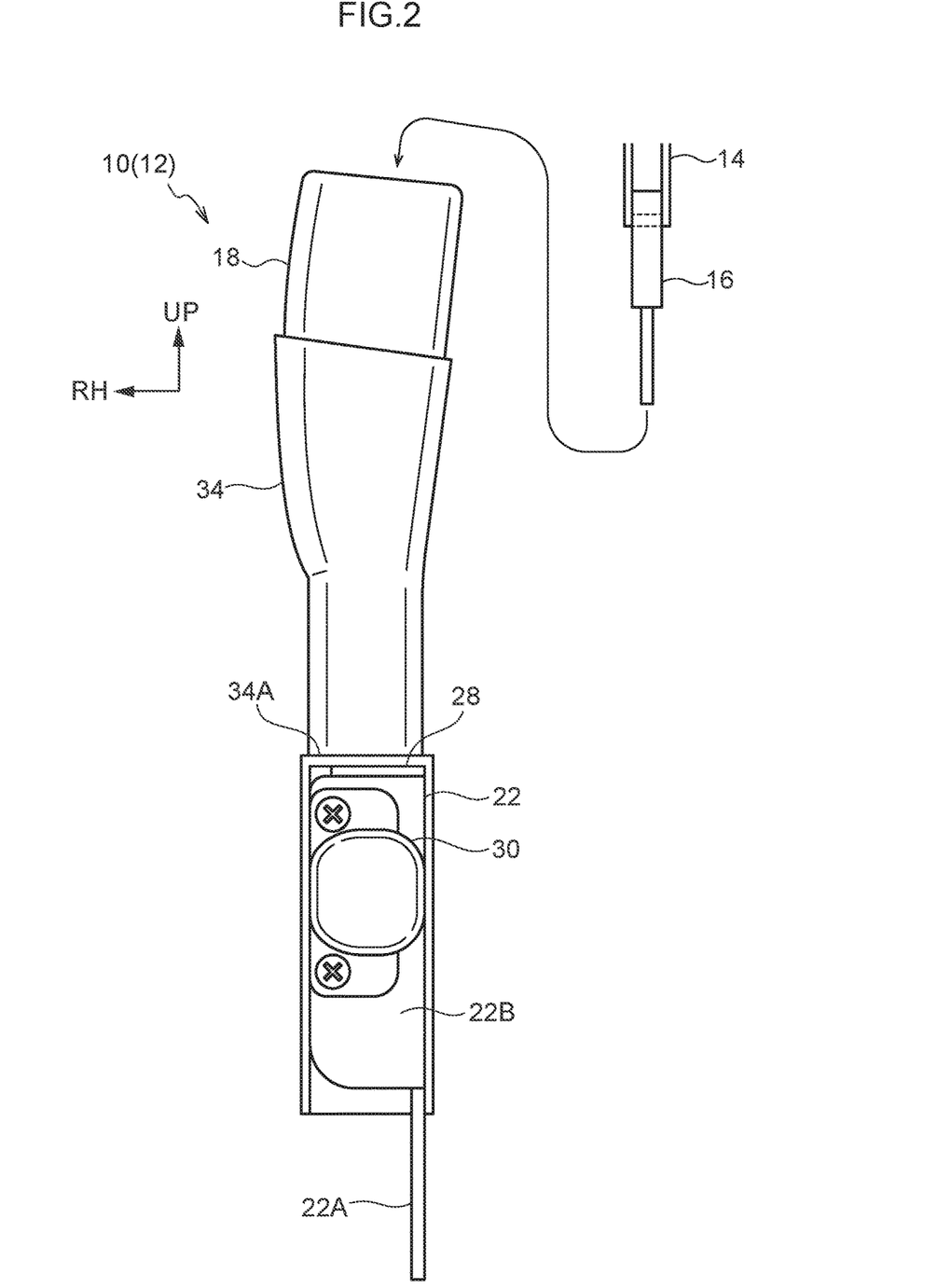
FIG. 2 is a side view illustrating the buckle device according to the first exemplary embodiment of the present invention, as viewed from the front.
Figure 3:
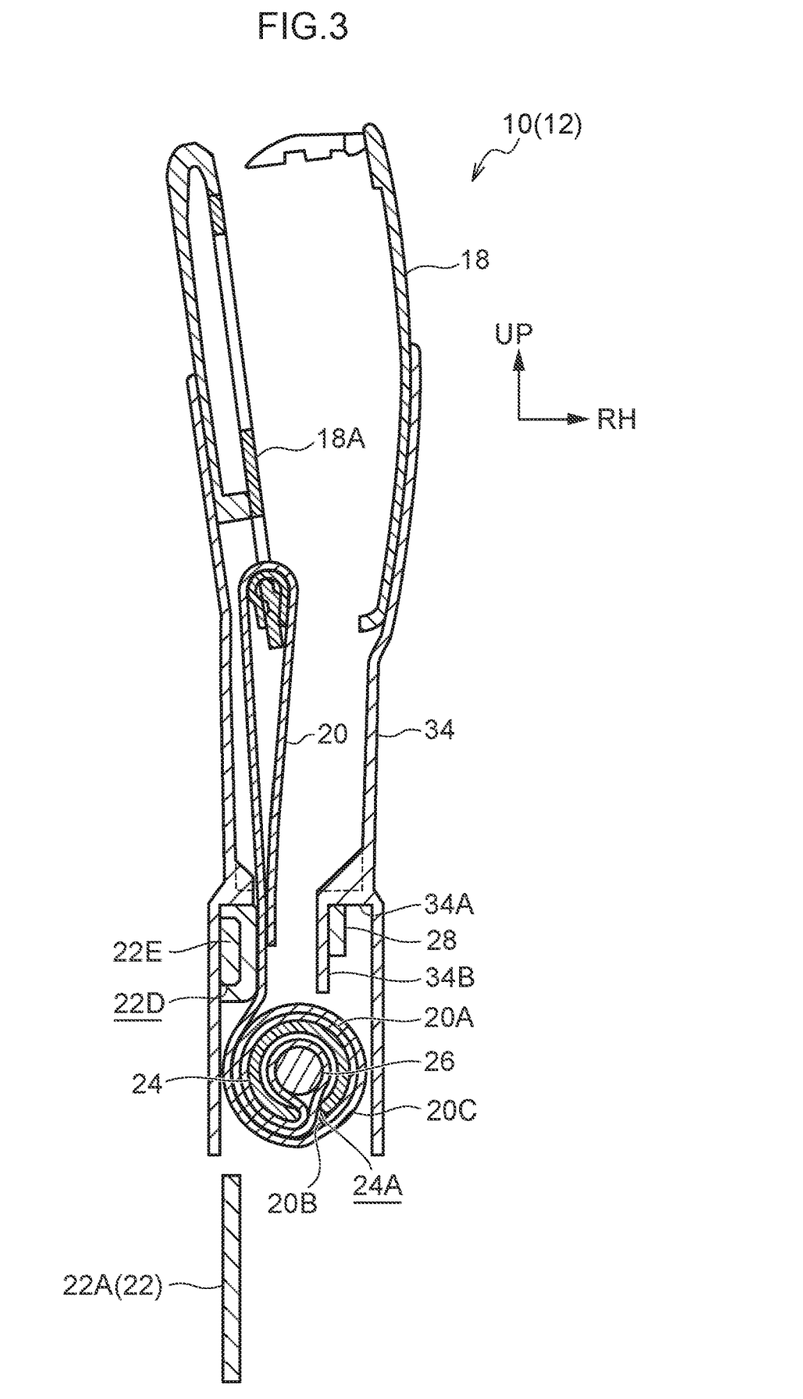
FIG. 3 is a cross-section illustrating the buckle device according to the first exemplary embodiment of the present invention, as viewed from the rear.

FIG. 1 is an exploded perspective view illustrating a buckle device 10 according to a first exemplary embodiment of the present invention, as viewed obliquely from the front-right. FIG. 2 is a side view illustrating the buckle device 10 as viewed from the front. FIG. 3 is a cross-section illustrating the buckle device 10 as viewed from the rear. Note that in the drawings, the arrow FR indicates a front side of the buckle device 10, the arrow RH indicates a right side (outward-facing side) of the buckle device 10, and the arrow UP indicates an upper side of the buckle device 10.

The buckle device 10 according to the present exemplary embodiment configures a seatbelt device 12 of a vehicle (automobile). The seatbelt device 12 is applied to a seat (not illustrated in the drawings) inside a vehicle cabin. A take-up device (not illustrated in the drawings) is provided to the seatbelt device 12. The take-up device is installed at a vehicle width direction outside and lower side of a rear section of the seat. An elongated belt-shaped webbing 14 (see FIG. 2) is taken up onto the take-up device from its base end side. The webbing 14 is urged toward its take-up side onto the take-up device, and is pulled out toward the upper side from the take-up device. A lock mechanism is provided to the take-up device. In a vehicle emergency (such as a collision), the lock mechanism locks pull-out of the webbing 14 from the take-up device.

A movable location of the webbing 14 further toward its leading end side than the take-up device is passed through a through anchor (not illustrated in the drawings). The through anchor is installed at the vehicle width direction outside and upper side of the seat rear section. An anchor (not illustrated in the drawings) is fixed to leading end portion of the webbing 14. The anchor is installed at the vehicle width direction outside and lower side of the seat rear section. A movable location of the webbing 14 between the through anchor and the anchor is passed through a tongue 16 (see FIG. 2).

The buckle device 10 is installed at the vehicle width direction inside and lower side of the seat rear section. The front, right, and upper sides of the buckle device 10 respectively correspond to a front or rear side, a vehicle width direction inside, and an upper side of the vehicle.

As illustrated in FIG. 1 to FIG. 3, a substantially rectangular-bodied buckle body 18 is provided at an upper section of the buckle device 10. The tongue 16 is capable of engaging with the buckle body 18 from the upper side. When the tongue 16 has engaged with the buckle body 18, the webbing 14 is worn by an occupant seated in the seat. Thus, a portion of the webbing 14 between the through anchor and the tongue 16 (shoulder webbing) is pulled obliquely across the occupant from one shoulder to their lumbar region (including their chest), and a portion of the webbing 14 between the tongue 16 and the anchor (lap webbing) is pulled horizontally across the lumbar region of the occupant. The engagement of the tongue 16 to the buckle body 18 can be released. When the engagement of the tongue 16 to the buckle body 18 is released, the occupant is released from wearing the webbing 14.

A lower side portion of the buckle body 18 gradually becomes smaller in a left-right direction on progression toward the lower side. A coupling plate 18A made of metal is provided inside the buckle body 18. The coupling plate 18A is exposed at the lower side of the buckle body 18.

Figure 4:
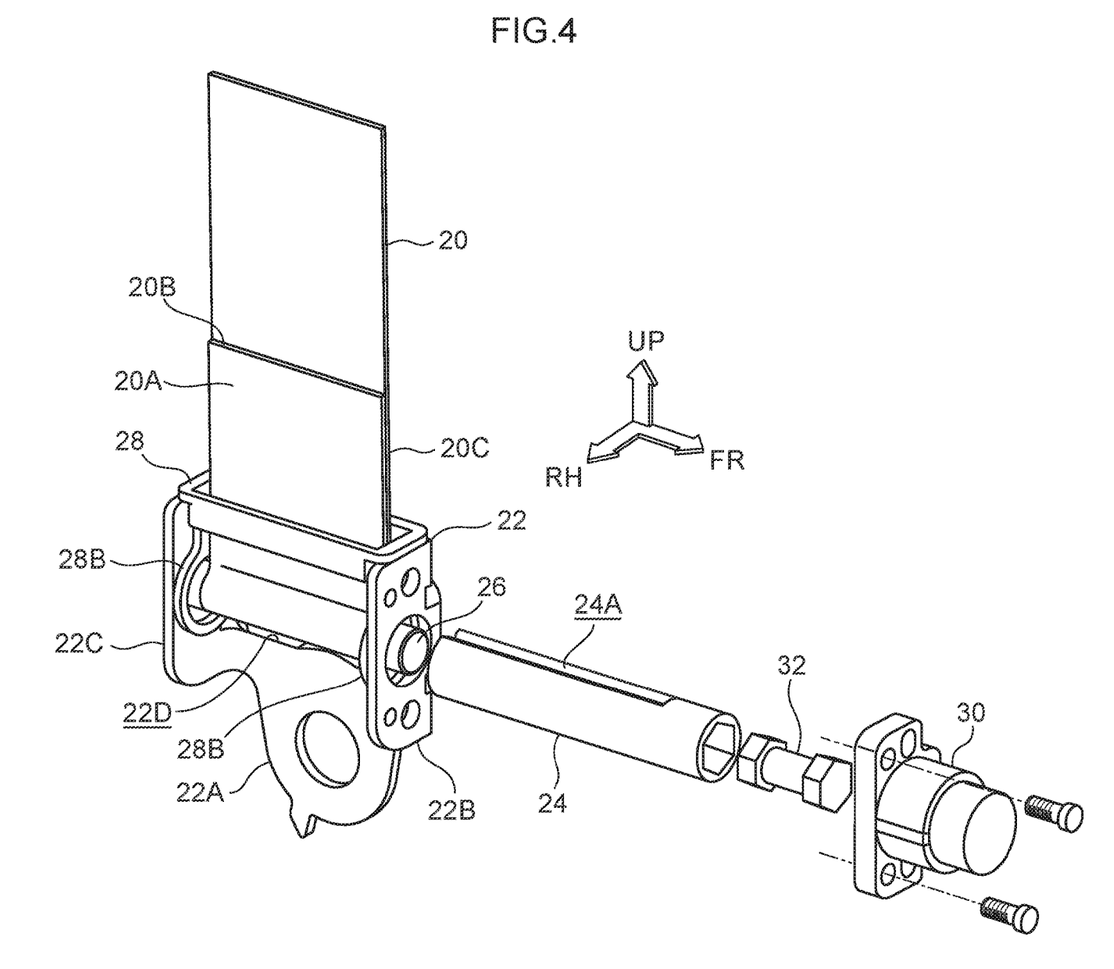
FIG. 4 is an exploded perspective view illustrating the interior of the buckle device according to the first exemplary embodiment of the present invention, as viewed obliquely from the front-right.
Figure 5:
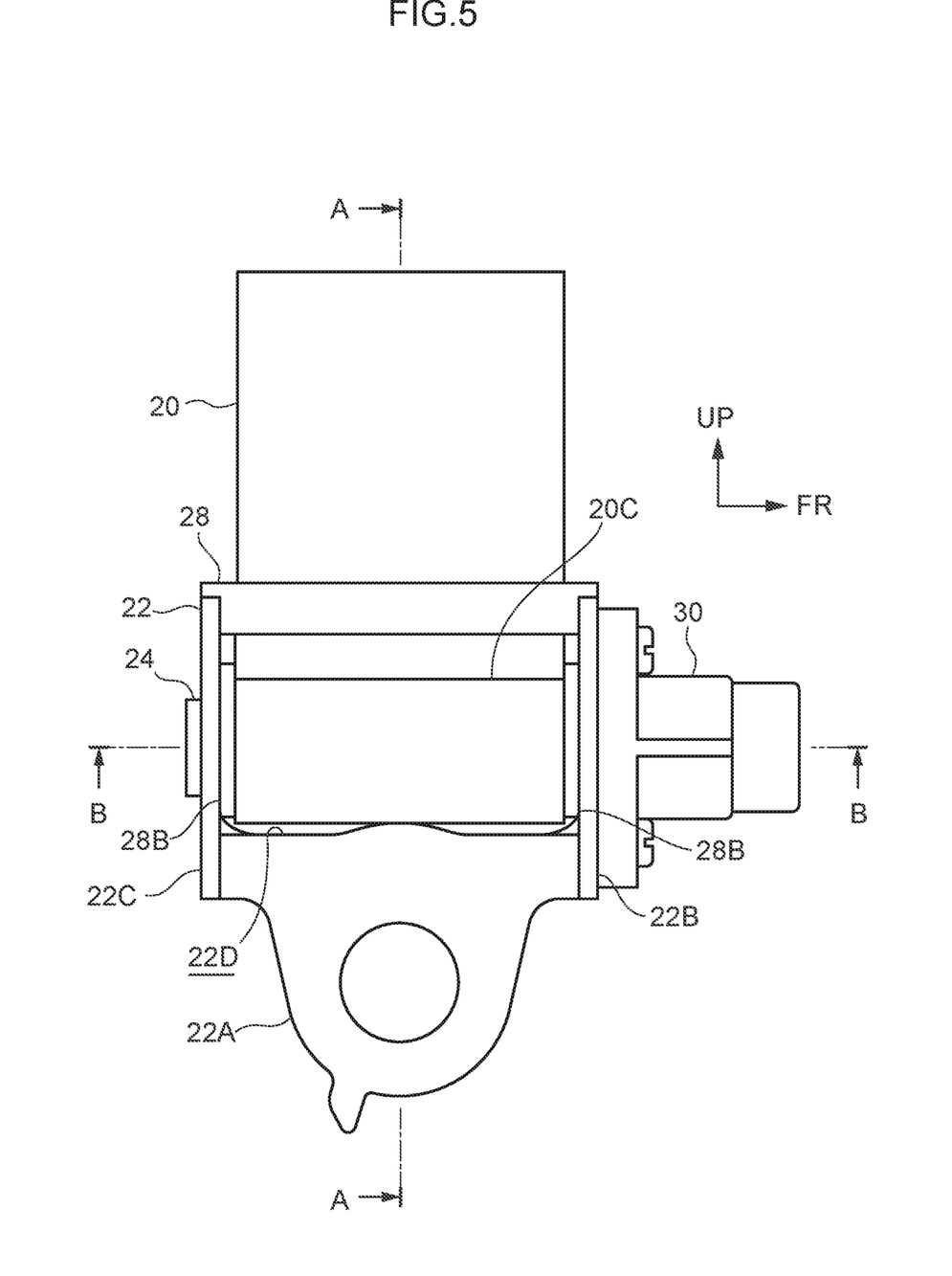
FIG. 5 is a face-on view illustrating the interior of the buckle device according to the first exemplary embodiment of the present invention, as viewed from the right.

A belt-shaped belt 20 (webbing) serving as a coupling member, is provided at the lower side of the buckle body 18. The belt 20 is for example made of the same material as the webbing 14. A leading end side portion (upper side portion) of the belt 20 is passed through the coupling plate 18A of the buckle body 18. A leading end portion (upper side end portion) of the belt 20 is folded back on itself and is stitched to a location of the belt 20 in the vicinity of the leading end portion. Thus, the leading end side portion of the belt 20 is ring shaped and is coupled to the buckle body 18 (coupling plate 18A). A base end portion 20A (lower side end portion) of the belt 20 is folded back on itself toward the right side and stitched to a location of the belt 20 in the vicinity of the base end portion 20A. Thus, a base end side portion (lower side portion) of the belt 20 is ring shaped (see FIG. 4). Hereafter, a range at the base end side portion of the belt 20 including up to a base end 20B (a leading end of the folded-back portion) of the belt 20 is referred to as a ring-shaped portion 20C of the belt 20.

A frame 22 (see FIG. 4, FIG. 5, FIG. 6A, and FIG. 6B), made of metal and serving as a support body, is provided at a lower section of the buckle device 10. The frame 22 has a U-plate shaped cross-section profile. A back plate 22A is provided at a left portion of the frame 22. A lower end portion of the back plate 22A of the frame 22 is fixed to the vehicle body (such as a lower-rear section of the seat). A leg plate 22B and a leg plate 22C are respectively provided at a front portion and a rear portion of the frame 22. The leg plate 22B and the leg plate 22C project toward the right from the back plate 22A. A rectangular placement hole 22D is formed penetrating an upper portion of the back plate 22A. The rectangular placement hole 22D extends in the front-rear direction along substantially the entire back plate 22A, and the leg plate 22B and the leg plate 22C are respectively disposed at the front side and rear side thereof. A portion of the back plate 22A further toward the upper side than the rectangular placement hole 22D configures a placement tab 22E.

A substantially circular tube-shaped spool 24, serving as a take-up shaft, is supported by the frame 22. The spool 24 is made of metal and has a high strength. The spool 24 is passed through the leg plate 22B and the leg plate 22C of the frame 22 such that the spool 24 is capable of rotating about its center axial line. An axial direction of the spool 24 runs parallel to a front-rear direction. The spool 24 is disposed at the right side of the rectangular placement hole 22D in the frame 22 (back plate 22A). An elongated rectangular insertion hole 24A is formed penetrating a portion of the spool 24 excluding a front portion thereof. The insertion hole 24A extends along the axial direction of the spool 24. The insertion hole 24A is open toward the rear side. Both width direction end faces of the insertion hole 24A are each curved so as to have a semicircular cross-section projecting toward the insertion hole 24A. An outer circumference of the spool 24 has a uniform radius around a circumferential direction of the spool 24, with the exception of the portion where the insertion hole 24A is formed.

A substantially circular column-shaped bar 26, made of metal and serving as an anchor member, is coaxially inserted inside the spool 24. Both axial direction end portions of the bar 26 each have an enlarged diameter that is coaxial to the spool 24 and fitted inside the spool 24. The ring-shaped portion 20C (base end side portion) of the belt 20 is inserted through the insertion hole 24A in the spool 24, and an axial direction intermediate portion of the bar 26 is inserted inside the ring-shaped portion 20C. The ring-shaped portion 20C of the belt 20 is thereby anchored by the bar 26 inside the spool 24, and coupled to the spool 24. The belt 20 is wound onto the spool 24 approximately 1.5 times. The base end portion 20A (folded-back portion) is disposed at a radial direction inner side of the spool 24 with respect to a location of the belt 20 in the vicinity of the base end portion 20A. The base end 20B (leading end of the folded-back portion) of the belt 20 is disposed in a gap between a portion of the belt 20 extending out through the insertion hole 24A and a peripheral face of the insertion hole 24A. The base end 20B of the belt 20 opposes the portion of the belt 20 extending out through the insertion hole 24A in a state close to this portion in the spool 24-circumferential direction. The portion of the belt 20 that has been wound onto the spool 24 is inserted through the placement hole 22D in the frame 22 (back plate 22A), such that the belt 20 is pulled out toward the upper side from the left side of the spool 24.

A substantially rectangular tube-shaped protector 28, made of resin and serving as a slide section, is fitted inside the upper portion of the frame 22. The belt 20 is inserted through the inside of the protector 28. A front portion and a rear portion of the protector 28 each have an inverted L-shaped cross-section. Upper portions of the front portion and the rear portion of the protector 28 are respectively mounted on the upper sides of the leg plate 22B and the leg plate 22C of the frame 22. A left portion of the protector 28 has a U-shaped cross-section. The inside of the left portion of the protector 28 is open toward the left side, and the placement tab 22E of the back plate 22A of the frame 22 is fitted into this opening. Circular ring plate-shaped rings 28B are integrally formed to the front portion and the rear portion of the protector 28. The rings 28B project toward the lower side, and the spool 24 is fitted inside the rings 28B.

A bottomed, substantially circular tube-shaped case 30 made of metal is fixed to the front side of the frame 22 (leg plate 22B). The front portion of the spool 24 is inserted inside the case 30. A substantially circular column-shaped torsion shaft 32, made of metal and serving as an energy absorption member, is disposed inside the case 30. A front end portion of the torsion shaft 32 is fitted inside the case 30 so as to be incapable of rotating relative thereto. An inner peripheral face of the front portion of the spool 24 is shaped such that a rear end portion of the torsion shaft 32 can be fitted therein. The rear end portion of the torsion shaft 32 is thereby coupled to the front portion of the spool 24 so as to be incapable of rotating relatively thereto, and so limits rotation of the spool 24.

A substantially rectangular tube-shaped boot 34 (cover), serving as a covering member, is provided over a range spanning from the buckle body 18 to the frame 22. The boot 34 is made of a soft flexible resin. An upper portion of the boot 34 gradually becomes smaller in the left-right direction on progression toward the lower side. The lower side portion of the buckle body 18 is fitted inside the upper portion of the boot 34 such that the boot 34 limits movement of the buckle body 18 toward the lower side. The belt 20 is inserted through the inside of an up-down direction intermediate portion of the boot 34. The inside of a lower portion of the boot 34 is open toward the front side, and the frame 22 (including the protector 28, the spool 24, and the bar 26) is fitted inside this lower portion. A rectangular frame plate-shaped abutting frame 34A is integrally formed directly above the lower portion of the boot 34. The belt 20 is inserted through the inside of the abutting frame 34A. An upper portion of the protector 28 abuts the lower side of the abutting frame 34A, thereby limiting movement of the boot 34 toward the lower side. A rectangular plate-shaped insertion portion 34B is integrally formed to the lower side of a right portion of the abutting frame 34A. A left face of the insertion portion 34B is flush against a right face at the inside of the abutting frame 34A. The insertion portion 34B is inserted inside the protector 28. The insertion portion 34B abuts a right face at the inside of the protector 28 and is fitted inside the protector 28 in the front-rear direction. In a state in which tensile force is acting on the belt 20 due to the belt 20 having been wound onto the spool 24 as described previously, elastic compression force acts on a location of the boot 34 between the buckle body 18 and the frame 22, such that the boot 34 urges the frame 22 toward the lower side and stands independently to the frame 22, and also urges the buckle body 18 toward the upper side so as to stand independently.

Next, explanation follows regarding operation of the present exemplary embodiment.

In the buckle device 10 of the seatbelt device 12 with the above-described configuration, the torsion shaft 32 limits rotation of the spool 24, such that pull-out of the belt 20 from the spool 24 and extending of the buckle body 18 toward the upper side is limited. When the tongue 16 of the webbing 14 is engaged with the buckle body 18, the webbing 14 is worn by the occupant.

In a vehicle emergency (such as a collision), the lock mechanism of the take-up device locks pull-out of the webbing 14 from the take-up device, such that the occupant is restrained by the webbing 14. In for example cases in which force due to inertia acts on the occupant such that the webbing 14 is pulled by the occupant, a force so as to pull out the belt 20 from the spool 24 is applied from the webbing 14 via the tongue 16 and the buckle body 18, such that rotation force acts on the spool 24. In cases in which the torsion shaft 32 is twisted and deformed by this rotation force acting on the spool 24, rotation of the spool 24 is permitted and pull-out of the belt 20 from the spool 24 is permitted, such that extending of the buckle body 18 (including the tongue 16) toward the upper side is permitted. Load acting on the occupant (particularly on their chest) from the webbing 14 is thereby alleviated (limited by an extending-permitting load (force limiter load) on the buckle body 18), and kinetic energy of the occupant is absorbed by torsional deformation of the torsion shaft 32.

Figure 6A:
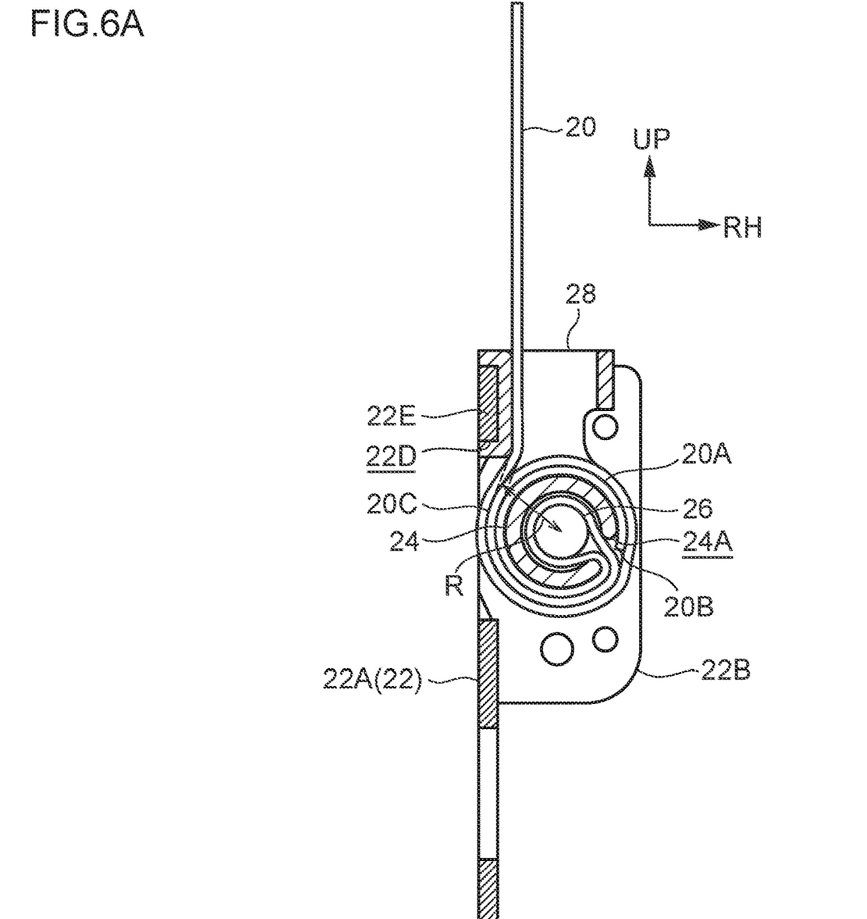
FIG. 6A is a cross-section (sectioned along line A-A in FIG. 5) illustrating the interior of the buckle device according to the first exemplary embodiment of the present invention, as viewed from the rear.
Figure 6B:
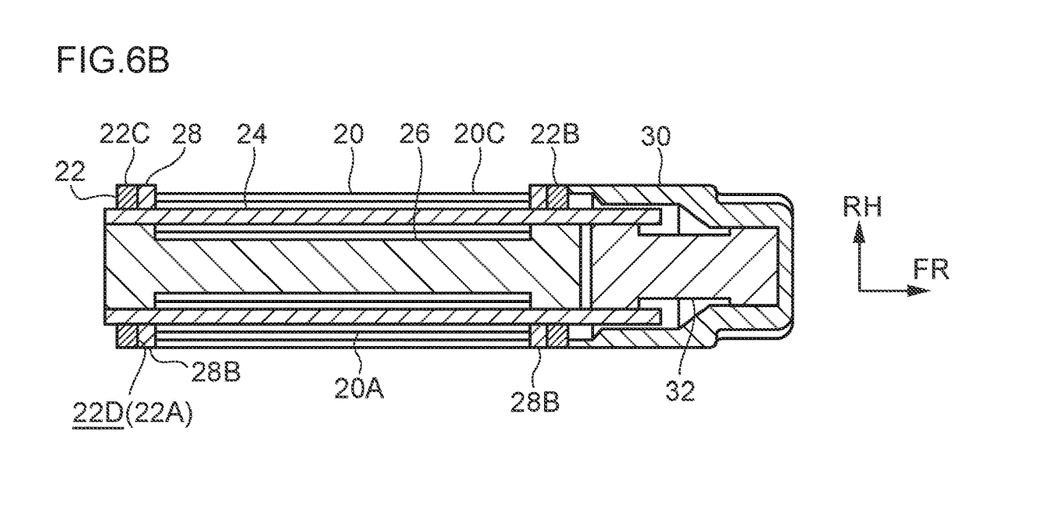
FIG. 6B is a cross-section (sectioned along line B-B in FIG. 5) illustrating the interior of the buckle device according to the first exemplary embodiment of the present invention, as viewed from below.

Since the belt 20 causes torque to act on the spool 24 such that pull-out of the belt 20 from the spool 24 is permitted, when a combined radius of the belt 20 and the spool 24 at a pull-out position of the belt 20 from the spool 24 (hereafter referred to as the "belt 20-winding radius R"; see FIG. 6A) is small, the load at which pull-out of the belt 20 from the spool 24 is permitted (hereafter referred to as the "belt 20-pull-out permitting load) is large. In particular, the spool 24 has a small radius such that the thickness of the belt 20 is large in proportion to the radius of the spool 24, and the belt 20 has been wound approximately 1.5 times onto the spool 24 such that the belt 20-winding radius R is small. Thus, the proportional increase in the belt 20-pull-out permitting load by the decrease in the belt 20-winding radius R is large.

Figure 7A:
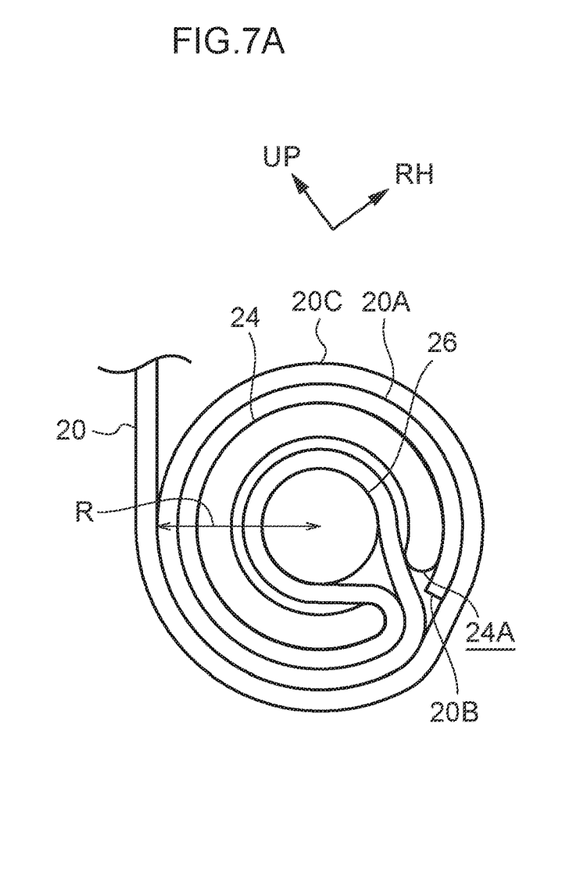
FIG. 7A is a cross-section illustrating a state prior to a belt being pulled out from a spool in the buckle device according to the first exemplary embodiment of the present invention, as viewed from the rear.
Figure 7B:
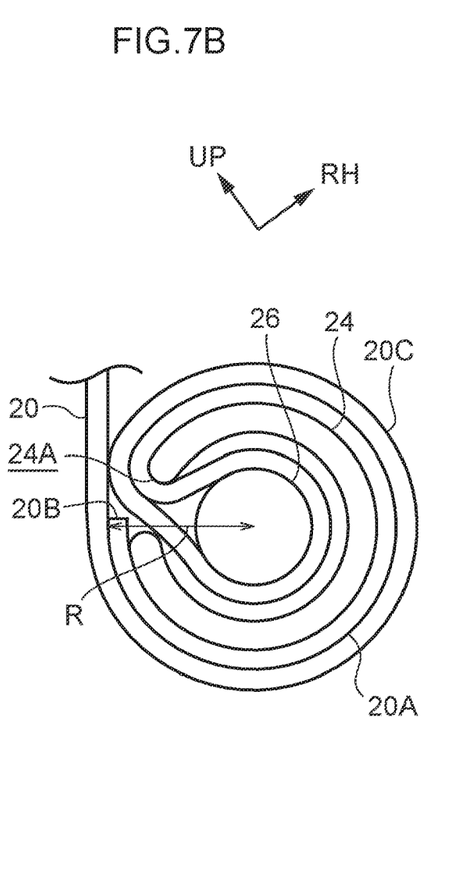
FIG. 7B is a cross-section illustrating a state while the belt is being pulled out from the spool in the buckle device according to the first exemplary embodiment of the present invention, as viewed from the rear.
Figure 7C:
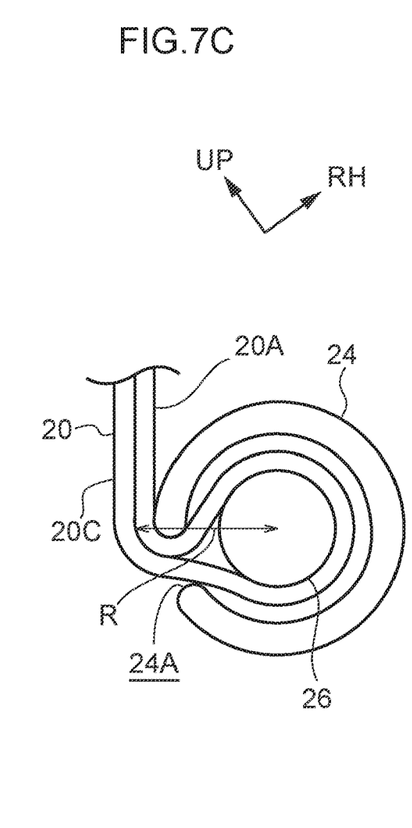
FIG. 7C is a cross-section illustrating a state after pull-out of the belt from the spool has ended in the buckle device according to the first exemplary embodiment of the present invention, as viewed from the rear.

Note that the base end portion 20A of the belt 20 is folded back on itself to form the ring-shaped portion 20C, and the belt 20 is wound onto the spool 24 in a state in which the ring-shaped portion 20C of the belt 20 has been inserted through the insertion hole 24A in the spool 24. Thus, when a second wind (second lap) of the belt 20 is pulled out from the spool 24 (see FIG. 7A), the belt 20-winding radius R is a combination of the thickness of two layers of the belt 20 and the radius of the spool 24. When a first wind (first lap) of the belt 20 is then pulled out from the spool 24 (see FIG. 7B and FIG. 7C), the belt 20-winding radius R is a combination of the thickness of one layer of the belt 20 and the radius of the spool 24. This enables the belt 20-winding radius R to be increased by the base end portion 20A of the belt 20, enables the belt 20-pull-out permitting load to be reduced, enables the load at which extending of the buckle body 18 is permitted (force limiter load) and therefore load acting on the occupant from the webbing 14 to be reduced, and enables the occupant to be well-protected.

Furthermore, the base end portion 20A of the belt 20 is folded back on itself at the radial direction inner side of the spool 24. Thus, as described above, even when the first wind of the belt 20 is pulled out from the spool 24 (when the ring-shaped portion 20C of the belt 20 is pulled out from the spool 24), the belt 20-winding radius R can be increased by the base end portion 20A of the belt 20, thereby enabling the belt 20-pull-out permitting load to be reduced.

Moreover, the base end 20B of the belt 20 is disposed in the gap between the portion of the belt 20 extending out through the insertion hole 24A and the peripheral face of the insertion hole 24A. Thus, when a location of the belt 20 in the vicinity of the ring-shaped portion 20C is pulled out, a reduction in the belt 20-winding radius R can be suppressed by the first wind of the belt 20 onto the spool 24, thereby enabling an increase in the belt 20-pull-out permitting load to be suppressed.

Furthermore, the base end 20B of the belt 20 opposes the portion of the belt 20 extending out from the insertion hole 24A in a state close to this portion in the spool 24-circumferential direction. Thus, when a location of the belt 20 at the position of the base end 20B is pulled out, a reduction in the belt 20-winding radius R can be suppressed by the base end 20B of the belt 20, thereby enabling an increase in the belt 20-pull-out permitting load to be suppressed.

Second Exemplary Embodiment

Figure 8A:
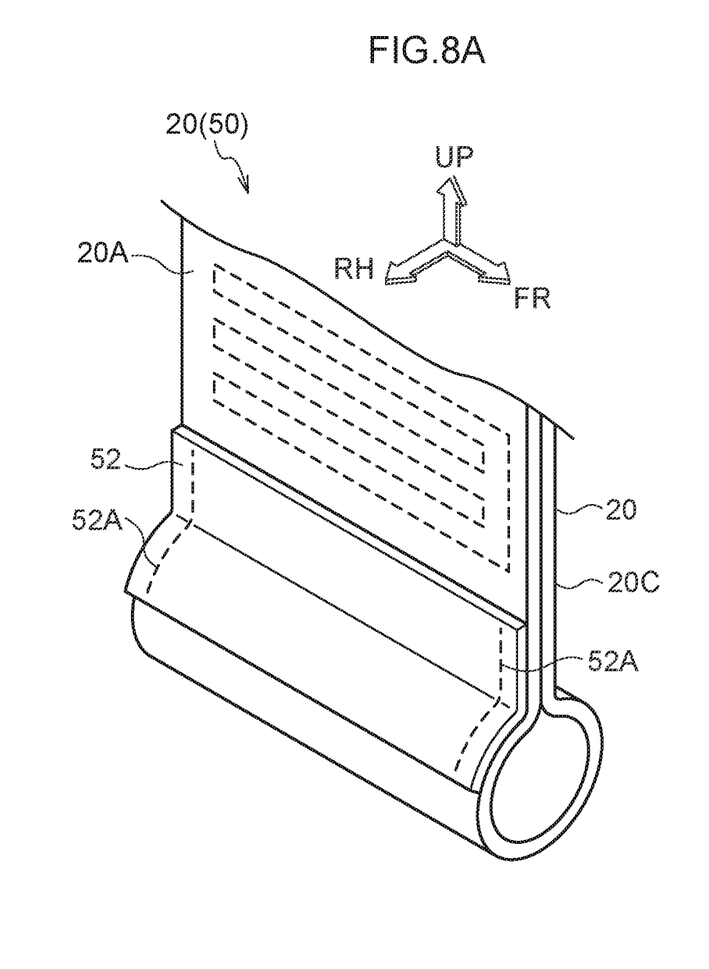
FIG. 8A is a perspective view illustrating a belt of a buckle device according to a second exemplary embodiment of the present invention, as viewed obliquely from the front-right.
Figure 8B:
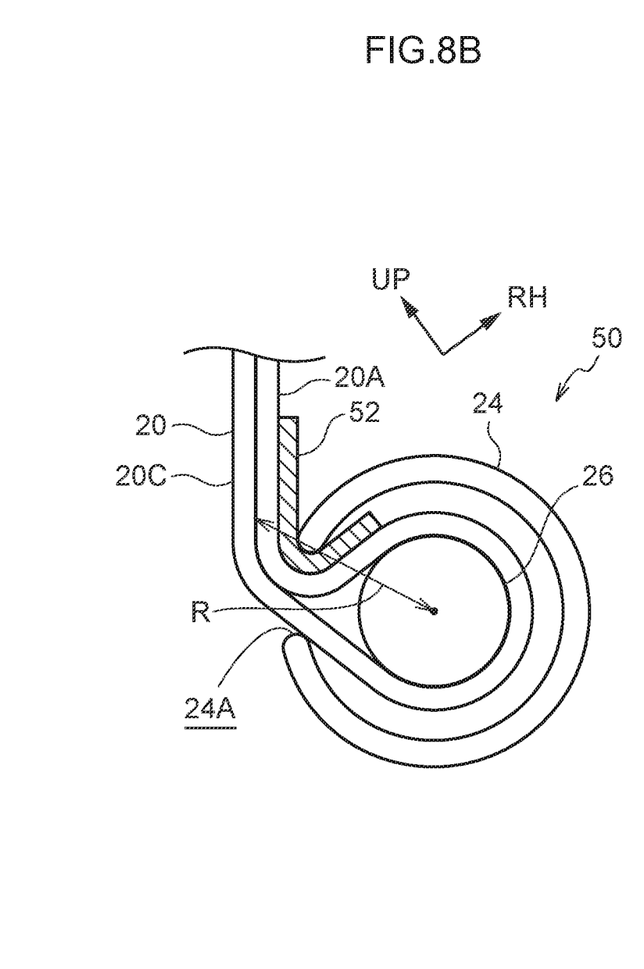
FIG. 8B is a cross-section illustrating a point in time after pull-out of the belt from the spool has ended in the buckle device according to the second exemplary embodiment of the present invention, as viewed from the rear.

FIG. 8A is a perspective view illustrating a belt 20 of a buckle device 50 according to a second exemplary embodiment of the present invention, as viewed obliquely from the front-right. FIG. 8B is a cross-section illustrating a point in time after pull-out of the belt 20 of the buckle device 50 from a spool 24 has ended, as viewed from the rear.

The buckle device 50 according to the present exemplary embodiment has basically the same configuration as the first exemplary embodiment, but differs in the following points.

As illustrated in FIG. 8A and FIG. 8B, in the buckle device 50 according to the present exemplary embodiment, a rectangular protective cloth 52, serving as an interjacent member, is provided to the base end portion 20A of the belt 20 in the vicinity of a folded-back position (a base end of the folded-back portion). The protective cloth 52 is for example made of the same material as the belt 20, cloth, or resin. The protective cloth 52 is disposed across the entire width direction of the base end portion 20A of the belt 20. The protective cloth 52 is fixed to both width direction end portions of the base end portion 20A of the belt 20 by stitching 52A along a length direction of the belt 20. The protective cloth 52 is inserted through the insertion hole 24A in the spool 24. The protective cloth 52 is interposed between the base end portion 20A of the belt 20 and a peripheral face of the insertion hole 24A, and is also disposed inside the spool 24 and at the outer periphery of the spool 24.

Note that the present exemplary embodiment enables similar operation and advantageous effects to those in the first exemplary embodiment to be exhibited.

Furthermore, the protective cloth 52 is interposed between the base end portion 20A of the belt 20 and the peripheral face of the insertion hole 24A. This enables damage to the base end portion 20A of the belt 20 caused by this peripheral face of the insertion hole 24A to be suppressed by the protective cloth 52.

Figure 9:
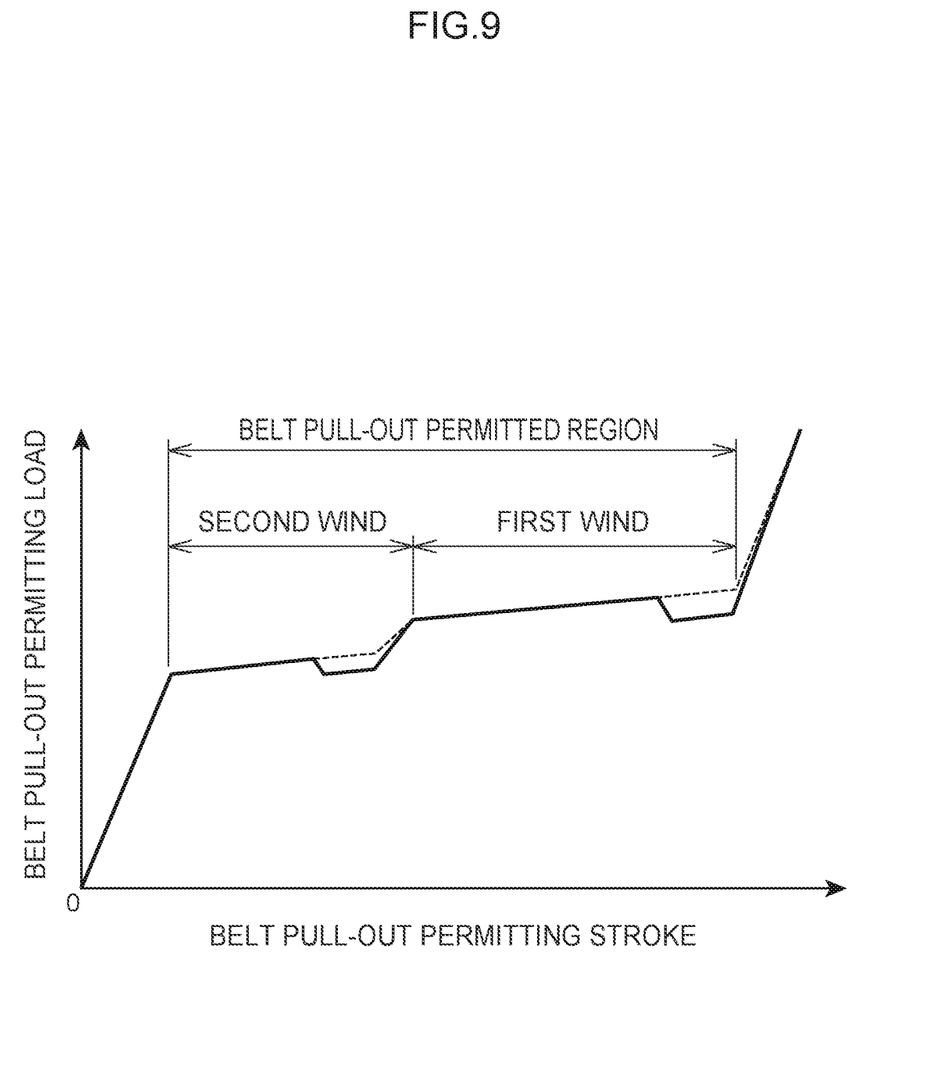
FIG. 9 is a graph illustrating a relationship between belt pull-out permitting stroke (horizontal axis) and belt pull-out permitting load (vertical axis) in the buckle device according to the second exemplary embodiment of the present invention.

The protective cloth 52 is also disposed at the outer periphery of the spool 24. Thus, when the belt 20 is pulled out at a circumferential direction position where the protective cloth 52 is disposed at the outer periphery of the spool 24, the belt 20-winding radius R is increased by the protective cloth 52, such that the belt 20-pull-out permitting load is reduced (see FIG. 9). This enables the load at which extending of the buckle body 18 is permitted (force limiter load) to be reduced.

In particular, when pull-out of the belt 20 from the spool 24 has ended (in the present exemplary embodiment, at a point in time before the belt 20-pull-out permitting load rises rapidly), the belt 20-winding radius R is increased by the protective cloth 52, such that the belt 20-pull-out permitting load is reduced. This enables a maximum value of the belt 20-pull-out permitting load to be reduced, enables a maximum value of the load at which extending of the buckle body 18 is permitted to be reduced, and enables the occupant to be well-protected.

Note that the protective cloth 52 is fixed to the belt 20 in the present exemplary embodiment. However, the protective cloth 52 may be fixed to the spool 24.

Furthermore, the belt 20 is wound onto the spool 24 approximately 1.5 times in the first exemplary embodiment and the second exemplary embodiment. However, the belt 20 may be wound onto the spool 24 more or less than approximately 1.5 times (such as two or more times).

Moreover, in the first exemplary embodiment and the second exemplary embodiment, the base end portion 20A of the belt 20 is disposed at the radial direction inner side of the spool 24 with respect to a location of the belt 20 in the vicinity of the base end portion 20A. However, the base end portion 20A of the belt 20 may be disposed at the radial direction outer side of the spool 24 with respect to the location of the belt 20 in the vicinity of the base end portion 20A.

Furthermore, in the first exemplary embodiment and the second exemplary embodiment, the base end 20B of the belt 20 is disposed at a circumferential direction position of the spool 24 in the gap between the portion of the belt 20 extending out through the insertion hole 24A and the peripheral face of the insertion hole 24A. However, the base end 20B of the belt 20 may be disposed at a circumferential direction position of the spool 24 other than the gap between the portion of the belt 20 extending out through the insertion hole 24A and the peripheral face of the insertion hole 24A.

Moreover, in the first exemplary embodiment and the second exemplary embodiment, the torsion shaft 32 (energy absorption member) undergoes torsional deformation to permit rotation of the spool 24. However, rotation of the spool 24 may be permitted due to a bent rod-shaped energy absorption member being moved and squeezed along its length direction (due to a bend position of the energy absorption member being displaced). Furthermore, rotation of the spool 24 may be permitted while the energy absorption member generates friction force.

What is claimed is:

1. A buckle device comprising:
    a buckle body configured to engage with a tongue provided at a webbing worn by an occupant;
    a coupling member that has a leading end side coupled to the buckle body and a base end portion folded back on itself to form a ring-shaped portion; and
    a take-up shaft that has an inner portion open through an insertion hole,
    the coupling member being wound onto the take-up shaft in a state in which the ring-shaped portion of the coupling member has been inserted through the insertion hole and anchored at the inner portion of the take-up shaft such that the take-up shaft is coupled to the buckle body via the coupling member,
    the take-up shaft being configured to limit pull-out of the coupling member and to permit pull-out of the coupling member at a pull-out permitting load or greater so as to permit extending of the buckle body.

2. The buckle device of claim 1, wherein the base end portion of the coupling member is folded back on itself at a radial direction inner side of the take-up shaft.

3. The buckle device of claim 1, wherein a base end of the coupling member is disposed at a circumferential direction position of the take-up shaft in a gap between the coupling member and a peripheral face of the insertion hole.

4. The buckle device of claim 1, further comprising an interjacent member interposed between the ring-shaped portion of the coupling member and a peripheral face of the insertion hole.

5. The buckle device of claim 4, wherein the interjacent member is disposed at an outer periphery of the take-up shaft.

6. The buckle device of claim 4, wherein the interjacent member is disposed inside the take-up shaft.

7. The buckle device of claim 1, wherein a base end of the coupling member opposes a portion of the coupling member extending out through the insertion hole in a circumferential direction of the take-up shaft.

8. The buckle device of claim 1, wherein a location of the coupling member further toward a leading end side than the ring-shaped portion is configured so as to not contact an outer periphery of the take-up shaft.

9. The buckle device of claim 1, wherein the take up shaft is tubular.

* * * * *